US008279389B2

(12) United States Patent
Lee

(10) Patent No.: US 8,279,389 B2
(45) Date of Patent: Oct. 2, 2012

(54) LIQUID CRYSTAL DISPLAY DEVICE HAVING STORAGE LINES OVERLAPPING ACTIVE LAYERS FORMED OF POLYSILICON MATERIAL

(75) Inventor: Kyung Eon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 210 days.

(21) Appl. No.: 11/152,102

(22) Filed: Jun. 15, 2005

(65) Prior Publication Data

US 2006/0092342 A1 May 4, 2006

(30) Foreign Application Priority Data

Nov. 4, 2004 (KR) .................. 10-2004-0089400

(51) Int. Cl.
*G02F 1/1343* (2006.01)
*G02F 1/136* (2006.01)

(52) U.S. Cl. .............. 349/140; 349/38; 349/39; 349/43; 349/47

(58) Field of Classification Search ............... 349/38, 349/39, 47, 140, 43
See application file for complete search history.

(56) References Cited

U.S. PATENT DOCUMENTS

| 5,159,476 | A | * | 10/1992 | Hayashi | 349/39 |
| 5,289,174 | A | * | 2/1994 | Suzuki | 345/98 |
| 5,600,461 | A | * | 2/1997 | Ueda et al. | 349/38 |
| 6,791,647 | B1 | * | 9/2004 | Kim et al. | 349/129 |
| 2002/0036724 | A1 | * | 3/2002 | Ha | 349/38 |
| 2003/0107687 | A1 | * | 6/2003 | Choo et al. | 349/39 |
| 2003/0184686 | A1 | * | 10/2003 | Jung et al. | 349/43 |

FOREIGN PATENT DOCUMENTS

| KR | 1020040026859 | 4/2004 |
| KR | 1020040064466 | 7/2004 |

OTHER PUBLICATIONS

Communication from Korean Patent Office dated Apr. 28, 2006.

* cited by examiner

*Primary Examiner* — Lauren Nguyen
(74) *Attorney, Agent, or Firm* — McKenna Long & Aldridge LLP

(57) ABSTRACT

A poly-silicon type thin film transistor substrate includes: a plurality of gate lines and data lines defining a pixel; a pixel electrode in the pixel; a thin film transistor having a gate electrode connected to one of the gate lines, a source electrode connected to one of the data lines, a drain electrode connected to the pixel electrode, and a first active layer of poly-silicon defining a channel between the source electrode and the drain electrode; and at least two storage lines positioned on different sides of the pixel electrode.

9 Claims, 16 Drawing Sheets

LIQUID CRYSTAL DISPLAY DEVICE HAVING STORAGE LINES OVERLAPPING ACTIVE LAYERS FORMED OF POLYSILICON MATERIAL

This application claims the benefit of the Korean Patent Application No. P2004-089400 filed on Nov. 4, 2004, which is hereby incorporated by reference.

BACKGROUND OF THE INVENTION

1. Field of the Invention

This invention relates to a liquid crystal display, and more particularly to a thin film transistor substrate of polycrystalline silicon (poly-silicon) type and a fabricating method thereof. Although the present invention is suitable for a wide scope of applications, it is particularly suitable for improving an aperture ratio without a deterioration in a capacitance value of a storage capacitor.

2. Description of the Related Art

Generally, a liquid crystal display (LCD) has liquid crystal cells arranged in a matrix on a liquid crystal display panel to control light transmittance in accordance with video signals so as to display a picture. FIG. 1 is a plan view illustrating a related art thin film transistor substrate of amorphous silicon type. FIG. 2 is a cross-sectional view of the liquid crystal display panel taken along line I-I' in FIG. 1.

Referring to FIG. 1 and FIG. 2, the liquid crystal cell includes a thin film transistor (TFT) 30 connected to a gate line 2 and a data line 4, and a pixel electrode 22 and a storage capacitor 60 connected to the TFT 30. The TFT 30 switches a video signal onto the pixel electrode 22. To this end, the TFT 30 has a gate electrode 6 connected to the gate line 2, a source electrode 8 connected to the data line 4, and a drain electrode 10 connected, via a pixel contact hole 20, to the pixel electrode 22. Further, the TFT 30 includes an active layer 14 overlapping the gate electrode 6 with a gate insulating film 12 therebetween and defining a channel between the source electrode 8 and the drain electrode 10. On the active layer 14, ohmic contact layers 16 make ohmic contacts with the source electrode 8 extending from the data line 4 and the drain electrode 10.

The storage capacitor 60 enables video signals charged on the pixel electrode 22 to be stably maintained. To this end, the storage capacitor 60 includes a storage line 52 provided in parallel to the gate line 2 to act as a lower storage electrode, and a pixel electrode 22 acting as an upper storage electrode. The pixel electrode 22 is provided in such a manner as to overlap the storage line 52 with the gate insulating film 12 and a protective film 18 therebetween.

The storage line 52 of the related art storage capacitor 60 is formed of an opaque metal in such a manner as to cross the pixel with a first width W1. A problem occurs in that the aperture ratio is reduced by an area of the pixel electrode covered by the storage line 52. On the other hand, another problem is raised if an area of the storage line 52 over the pixel electrode 22 is reduced to prevent a deterioration of aperture ratio, in that a capacitance value of the storage capacitor 60 is reduced.

SUMMARY OF THE INVENTION

Accordingly, the present invention is directed to a thin film transistor substrate of poly-silicon type and a fabricating method thereof that substantially obviates one or more of the problems due to limitations and disadvantages of the related art.

An object of the present invention to provide a thin film transistor substrate of poly-silicon type and a fabricating method thereof that are adaptive for improving an aperture ratio without a deterioration in a capacitance value of a storage capacitor.

Another object of the present invention is to enhance electric charge mobility of an LCD device.

Another object of the present invention is to enhance response speed of an LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a thin film transistor substrate includes a plurality of gate lines and data lines defining a pixel, a pixel electrode in the pixel, a thin film transistor having a gate electrode connected to one of the gate lines, a source electrode connected to one of the data lines, a drain electrode connected to the pixel electrode, and a first active layer of polysilicon defining a channel between the source electrode and the drain electrode, and at least two storage lines positioned on different sides of the pixel electrode. In another aspect, a method of fabricating a poly-silicon type thin film transistor substrate according to another aspect of the present invention includes the steps of forming a first active layer, a second active layer and a third active layer on a substrate, forming a gate insulating film on the substrate to cover the active layers, forming a gate electrode, gate lines and at least two storage lines, forming an interlayer insulating film on the gate insulating film, forming a data line, a source electrode and a drain electrode connected to the first active layer, forming a protective film over the interlayer insulating film, and forming a pixel electrode connected to the drain electrode on the protective film, wherein the at least two storage lines are positioned on different sides of the pixel electrode.

In another aspect, a poly-silicon type thin film transistor substrate includes a plurality of gate lines and data lines defining a pixel, a pixel electrode in the pixel, a thin film transistor having a gate electrode connected to one of the gate lines, a source electrode connected to one of the data lines, a drain electrode connected to the pixel electrode, and a poly-silicon type first active layer defining a channel between the source electrode and the drain electrode, a first storage line, a second storage line, a second active layer extending from the first active layer and overlapping the first storage line with a gate insulating film between the second active layer and the first storage line for providing a first storage capacitor, and a third active layer overlapping the second storage line with the gate insulating film between the second storage line and the third active layer for providing a second storage capacitor.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings.

DETAILED DESCRIPTION OF THE PREFERRED EMBODIMENTS

Reference will now be made in detail to the preferred embodiments of the present invention, examples of which are illustrated in the accompanying drawings. Hereinafter, embodiments of the present invention will be described in detail with reference to FIGS. 3 to 9.

Figure 3:
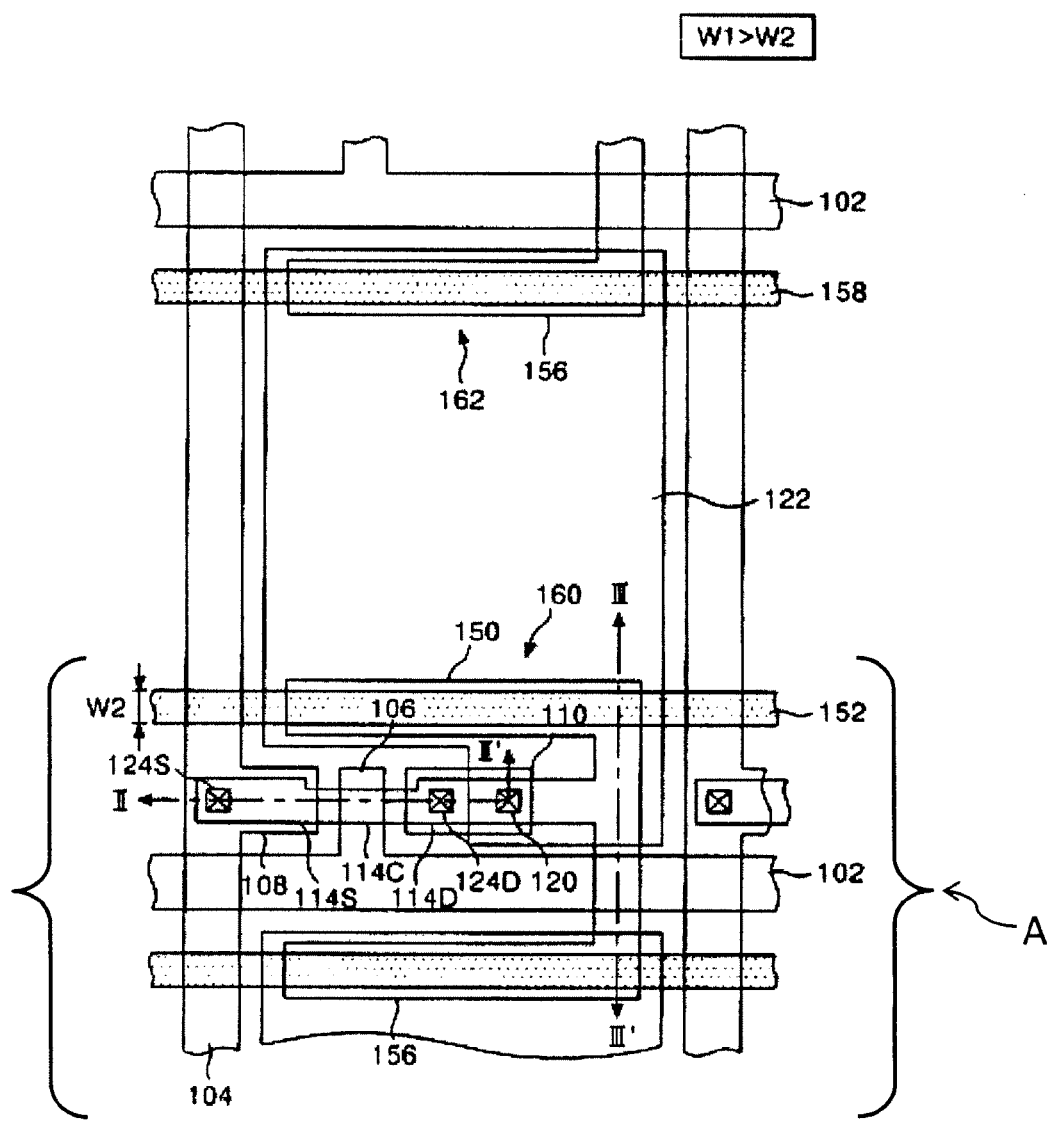
FIG. 3 is a plan view showing a portion of a thin film transistor type substrate employing poly-silicon according to a first embodiment of the present invention.
Figure 4:
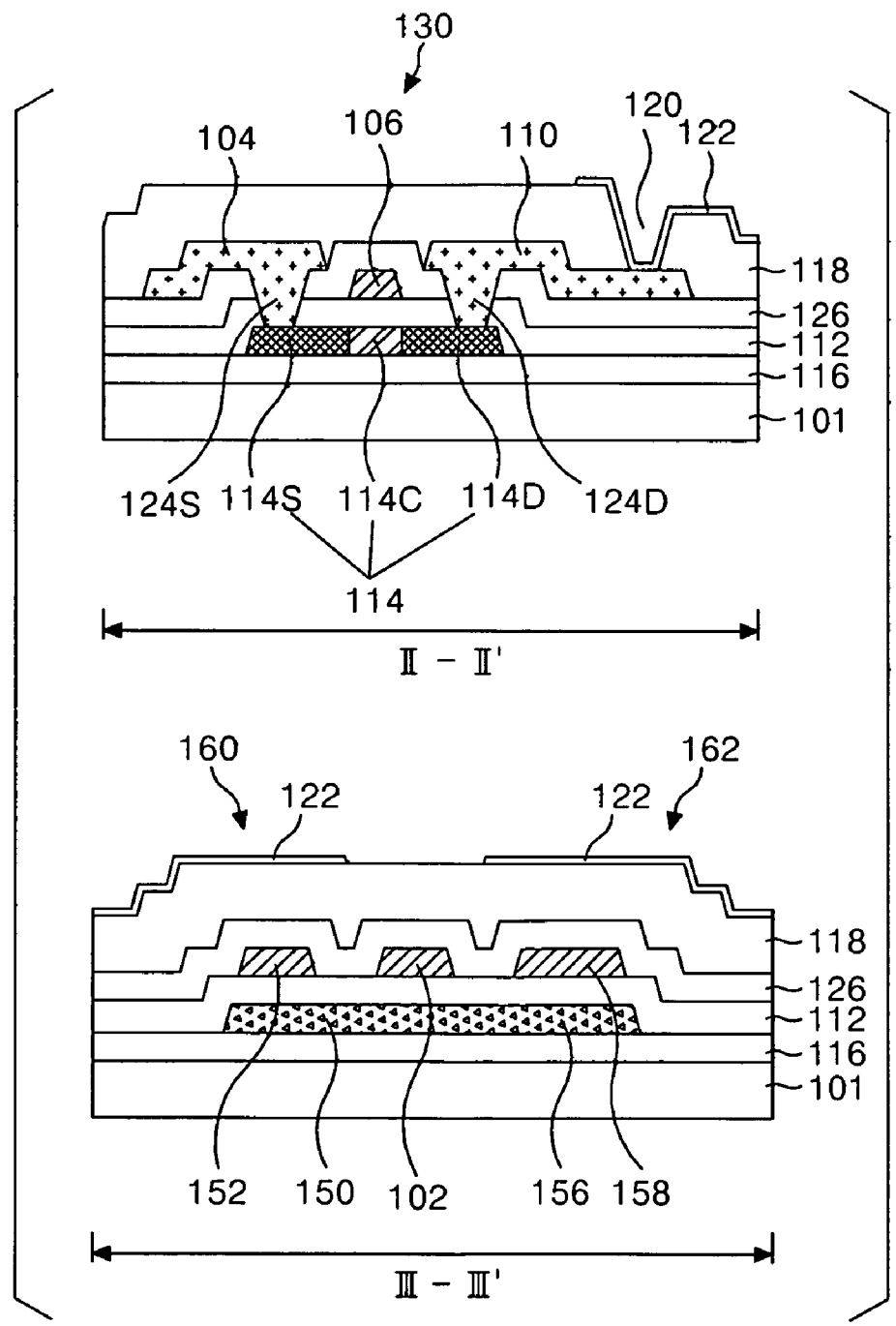
FIG. 4 are cross-sectional views of the thin film transistor substrate taken along line II-II' and line III-III' in FIG. 3.

FIG. 3 is a plan view showing a portion of a thin film transistor type substrate employing poly-silicon according to a first embodiment of the present invention. FIG. 4 are cross-sectional views of the thin film transistor substrate taken along line II-II' and line III-III' in FIG. 3. Referring to FIG. 3 and FIG. 4, the thin film transistor (TFT) substrate of poly-silicon type includes a TFT 130 connected to a gate line 102 and a data line 104, and a pixel electrode 122 and a storage capacitor 160 connected to the TFT 130. The TFT 130 is formed as either an N-type or a P-type. Hereinafter, the case of forming the TFT 130 in an N-type will be described.

The TFT 130 charges a video signal onto the pixel electrode. To this end, the TFT 130 includes a gate electrode 106 connected to the gate line 102, a source electrode 108 connected to the data line 104, a drain electrode 110 connected via a pixel contact hole 120 passing through a protective film 118 to the pixel electrode 122, and a first active layer 114 defining a channel between the source electrode 108 and the drain electrode 110 under the gate electrode 106. The first active layer 114 is provided on a lower substrate 101 with a buffer film 116 between the first active layer 114 and the lower substrate 101. The gate electrode 106 extending from the gate line 102 is provided in such a manner as to overlap a channel area 114C of the first active layer 114 with the gate insulating film 112 therebetween. The source electrode 108 and the drain electrode 110 are provided in such a manner as to be insulated from the gate electrode 106 by an interlayer insulating film 126.

The source electrode 108 and the drain electrode 110 are respectively connected via a source contact hole 124S and a drain contact hole 124 passing through the interlayer insulating film 126 and the gate insulating film 112 to a source area 114S and a drain area 114D of the first active layer 114 doped with $n^+$ impurities, respectively. The first active layer 114 may further include lightly doped drain (LDD) areas (not shown) doped with $n^-$ impurities between the channel area 114C and each of the source and drain areas 114S and 114D so as to reduce off-current.

Storage capacitors 160 and 162 allow video signals charged on the pixel electrode 122 to be stably maintained. To this end, the storage capacitor includes first and second storage capacitors 160 and 162 adjacent to the gate lines 102 and positioned adjacent to different sides of the pixel electrode 122. The first storage capacitor 160 is provided such that a first storage line 152, adjacent to the current stage gate line 102, overlaps a second active layer 150, extending from the first active layer 114 of the TFT 130, to act as a lower storage electrode with the gate insulating film 112 between the first storage line 152 and the active layer 150. Herein, the first storage line 152 has a second width W2 smaller than the width of the related art storage line.

The second storage capacitor 162 compensates for the small capacitance value of the first storage capacitor 160. The second storage capacitor 162 is provided such that the second storage line 158, adjacent to the previous stage gate line 102, overlaps a third active layer 156, extending from the first active layer 114 of the previous stage TFT, to act as a lower storage electrode with the gate insulating film 112 between the third active layer 156 and the second storage line 158. The second active layer 150 in the pixel is electrically connected to the third active layer 156 of the subsequent stage pixel. The first and second storage lines 152 and 158 extend across adjoining pixels.

As described above, the poly-silicon type thin film transistor substrate according to the first embodiment of the present invention is provided with first and second storage capacitors 160 and 162 at areas adjacent to the gate lines 102, which overlap a black matrix. Herein, these areas affect the aperture ratio less than at the center portion of the pixel because they are adjacent to the black matrix. Thus, the first and second storage capacitors 160 and 162 are positioned at areas that contribute little to the aperture ratio, so that an aperture ratio can be improved without any deterioration in a capacitance value of the storage capacitor.

Figure 5:
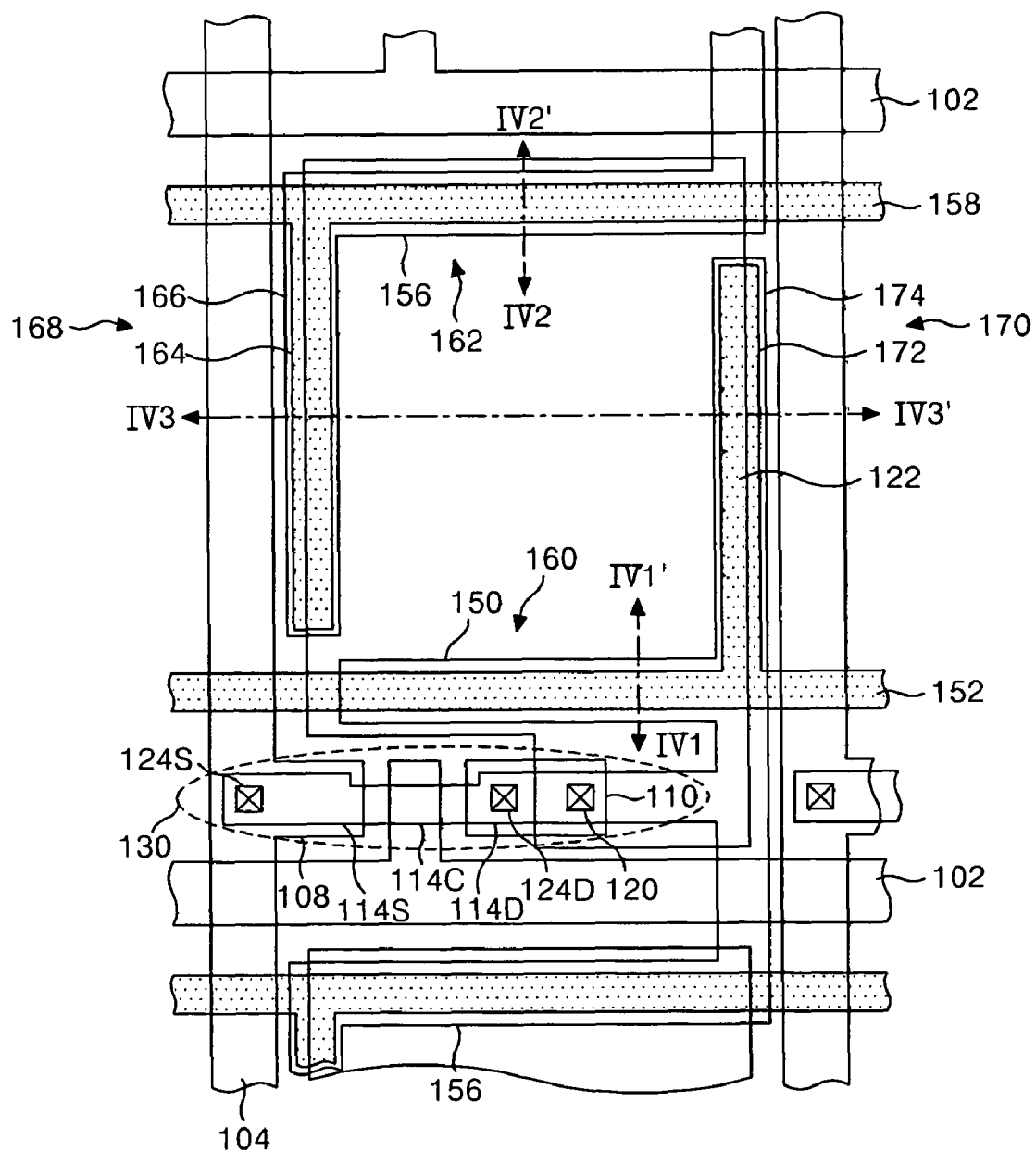
FIG. 5 is a plan view showing a portion of a thin film transistor type substrate employing poly-silicon according to a second embodiment of the present invention.
Figure 6:
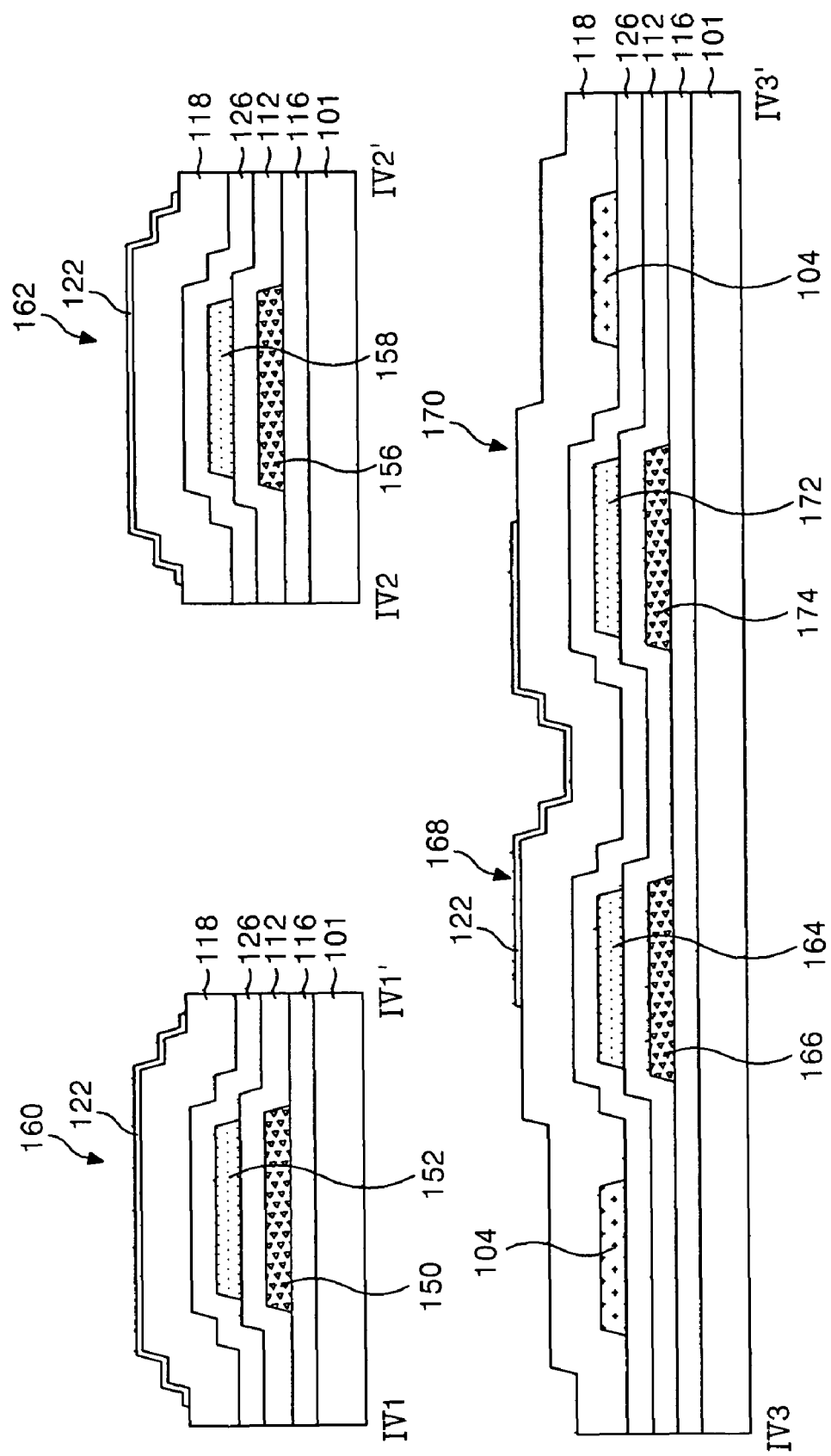
FIG. 6 is a cross-sectional view of the thin film transistor substrate taken along line IV1-IV1', line IV2-IV2' and line IV3-IV3' in FIG. 5.

FIG. 5 is a plan view showing a portion of a thin film transistor type substrate employing poly-silicon according to a second embodiment of the present invention. FIG. 6 is a cross-sectional view of the thin film transistor substrate taken along line IV1-IV1', line IV2-IV2' and line IV3-IV3' in FIG. 5. The poly-silicon type TFT substrate shown in FIG. 5 and FIG. 6 has some of the same elements as the poly-silicon type TFT substrate shown in FIG. 3 and FIG. 4 except that third and fourth storage capacitors 168 and 170 extending along the data lines 104 are further provided.

Storage capacitors 160, 162, 168 and 170 allow video signals charged on the pixel electrode 122 to be stably maintained. To this end, first and second storage capacitors 160 and 162 are positioned adjacent to the gate lines 102 at opposite sides of the pixel electrode 122, and third and fourth storage capacitors 168 and 170 are positioned adjacent to the data lines 104 at opposite sides of the pixel electrode 122.

The first storage capacitor 160 is provided such that a first storage line 152, adjacent to the current stage gate line 102, overlaps a second active layer 150, extending from the first active layer 114 of the TFT 130, to act as a lower storage electrode with the gate insulating film 112 therebetween. Herein, the first storage line 152 has a second width W2 smaller than the width of a related art storage line. The second storage capacitor 162 compensates for a capacitance value of the first storage capacitor 160 having a small capacitance value. The second storage capacitor 162 is provided such that the second storage line 158, adjacent to the previous stage gate line 102, overlaps a third active layer 156 connected to the first and second active layers 114 and 150 of the previous stage TFT 130, to act as a lower storage electrode with the gate insulating film 112 between the second storage line 158 and the third active layer 156. The third storage capacitor 168 is provided such that a third storage line 164, adjacent to the current stage data line 104 and extending from the second storage line 158, overlaps the fourth active layer 166, extending from the third active layer 156 of the second storage capacitor 162, to act as a lower storage electrode with the gate insulating film 112 between a third storage line 164 and the fourth active layer 166. The fourth storage capacitor 170 is provided such that a fourth storage line 172, adjacent to the next stage data line 104 and extending from the first storage line 152, overlaps a fifth active layer 174, extending from the second active layer 150 of the first storage capacitor 160, to act as a lower storage electrode with the gate insulating film 112 between a fourth storage line 172 and the fifth active layer 150.

As described above, the poly-silicon type thin film transistor substrate according to the second embodiment of the present invention is provided with the first through fourth storage capacitors 160, 162, 168 and 170 in such a manner that these capacitors are adjacent to the gate lines 102 and the data lines 104, which overlap a black matrix. Herein, each of the areas adjacent to the gate lines 102 and the data lines 104 contribute less to the aperture ratio than the center portion of the pixel because these areas are adjacent to the black matrix. The first to fourth storage capacitors 160, 162, 168 and 170 are positioned at these areas such that an aperture ratio can be improved without any deterioration in a capacitance value of the storage capacitor.

The poly-silicon type TFT substrate according to the second embodiment of the present invention has a larger total capacitance value than the total capacitance value of the poly-silicon type TFT substrate according to embodiments of the present invention. Thus, it becomes possible to reduce line widths of the first and second storage lines 152 and 158 if a capacitance value of the storage capacitor in the poly-silicon type TFT substrate according to the second embodiment of the present invention is made equal to that in the poly-silicon type TFT substrate according to the first embodiment of the present invention. The reduced line widths improve the aperture ratio.

Figure 7:
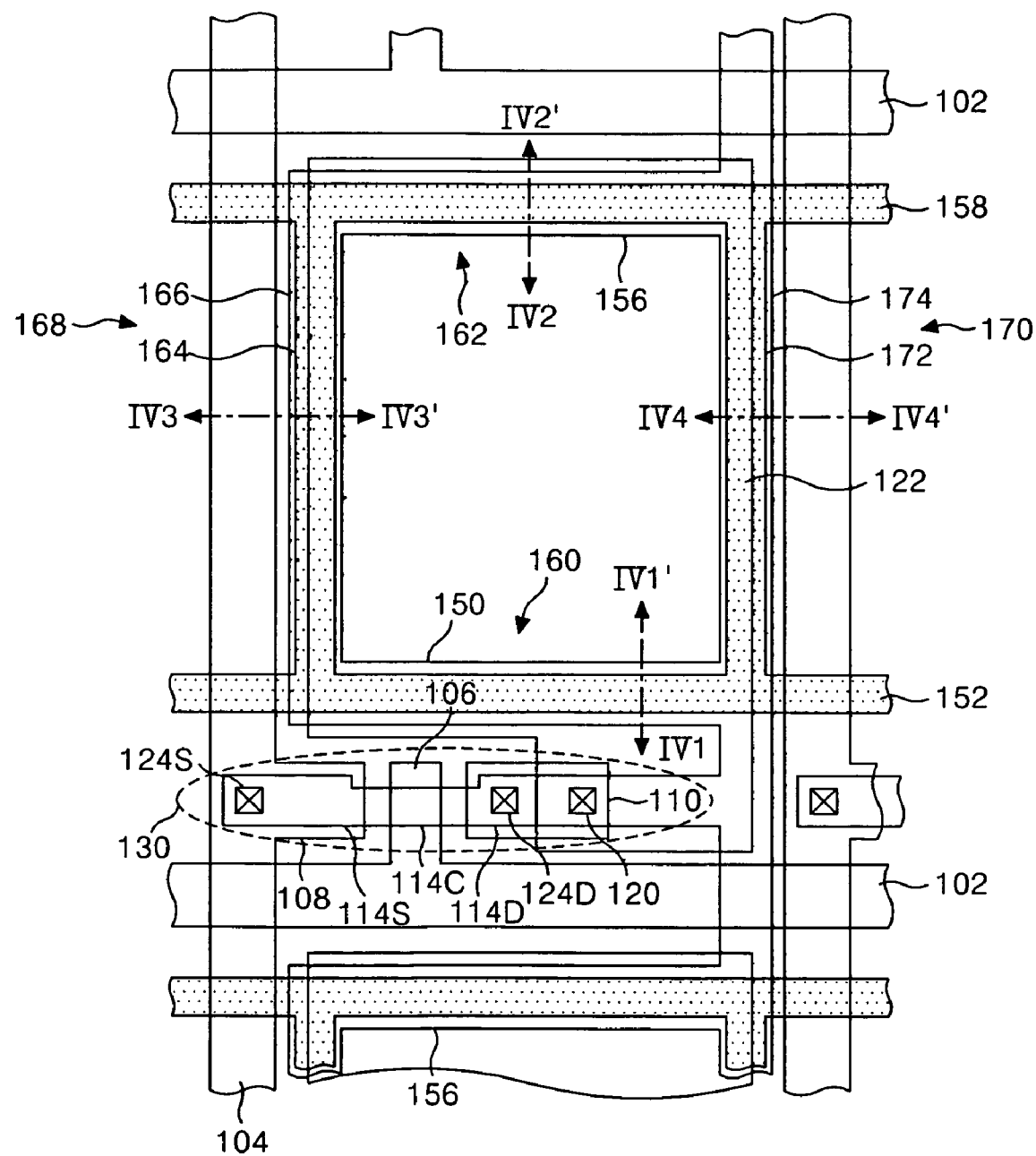
FIG. 7 is a plan view showing a portion of a thin film transistor type substrate employing poly-silicon according to a third embodiment of the present invention.

FIG. 7 is a plan view showing a portion of a thin film transistor type substrate employing poly-silicon according to a third embodiment of the present invention. The poly-silicon type TFT substrate shown in FIG. 7 has the same elements as the poly-silicon type TFT substrate shown in FIG. 5 and FIG. 6 except that the first and second storage lines 152 and 158 are electrically connected to each other, and the first, second, third and fourth active layers 114, 150, 156 and 166 are not connected to active layers in other pixels. Since a cross-sectional view of the thin film transistor substrate in FIG. 7 taken along line IV1-IV1', line IV2-IV2' and line IV3-IV3' is similar to FIG. 6, the poly-silicon type TFT substrate according to the third embodiment of the present invention will be described in conjunction with FIGS. 6 and 7.

Figure 1:
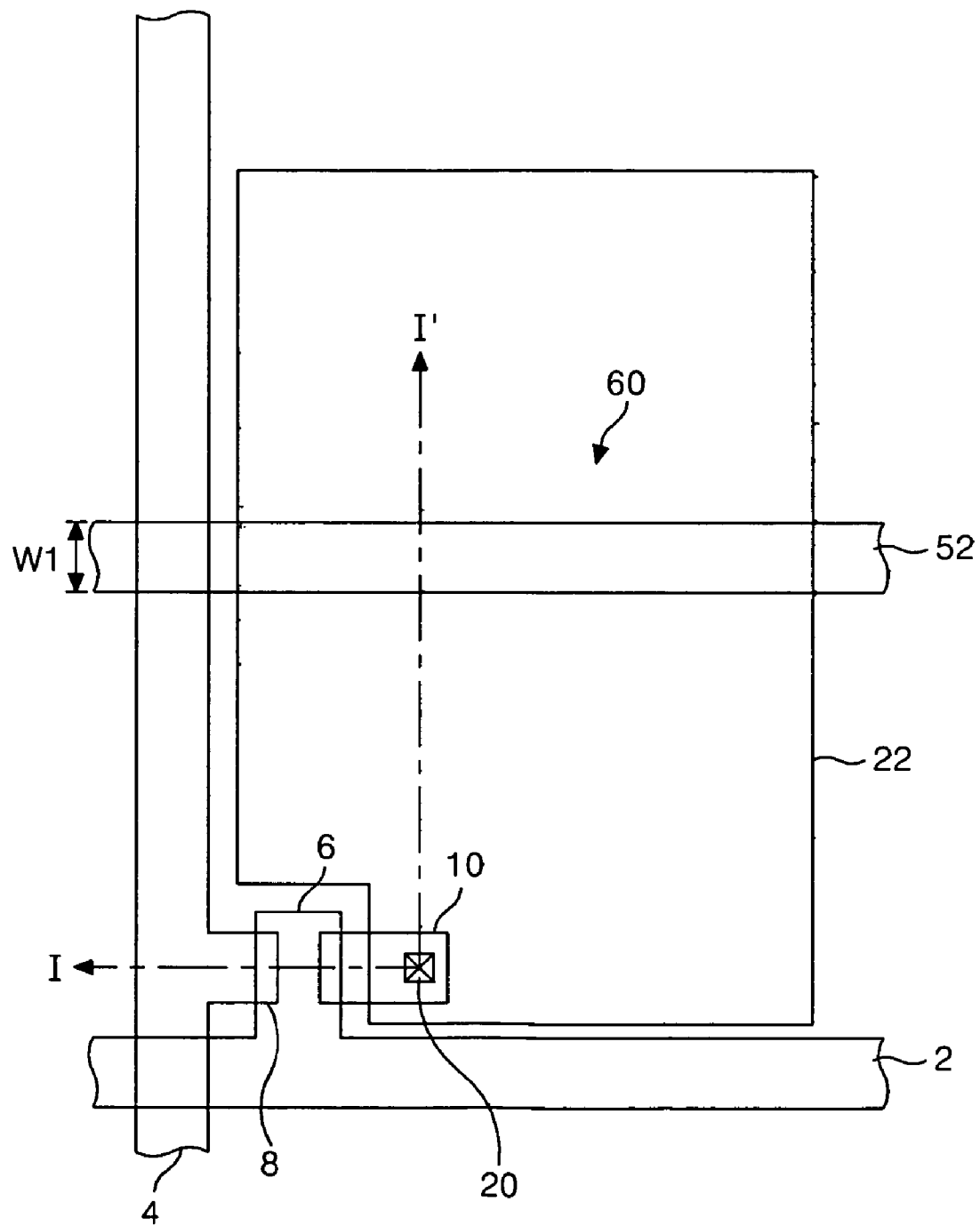
FIG. 1 is a plan view showing a portion of a related art thin film transistor substrate liquid crystal display panel.
Figure 2:
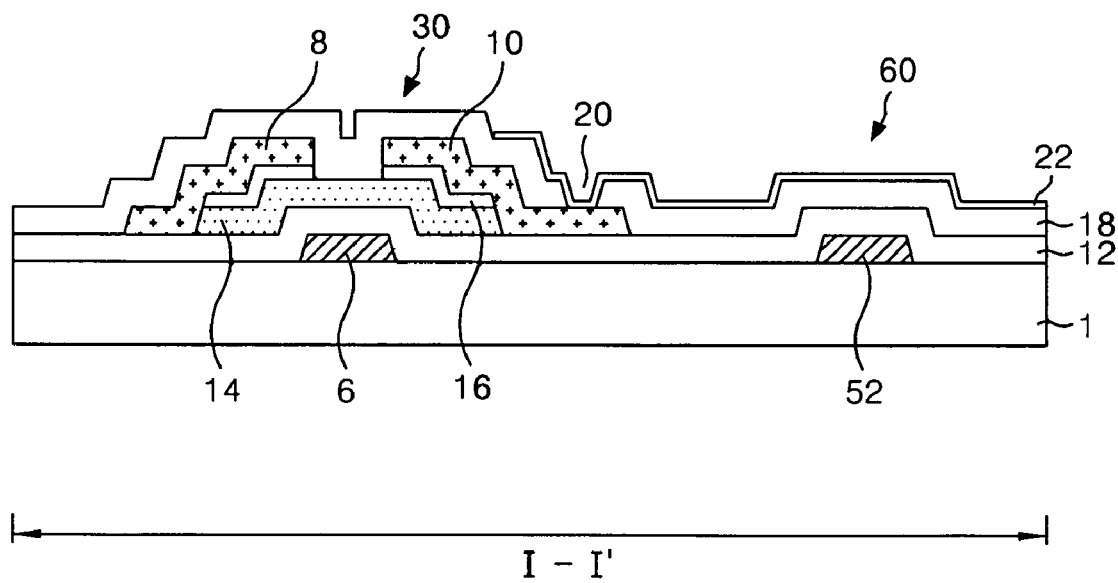
FIG. 2 is a cross-sectional view of the thin film transistor substrate taken along line I-I' in FIG. 1.

The first storage capacitor 160 is provided such that a first storage line 152, adjacent to the current stage gate line 102, overlaps a second active layer 150, extending from the first active layer 114 of the TFT 130, to act as a lower storage electrode having the gate insulating film 112 between the first storage line 152 and the second active layer 150. Herein, the first storage line 152 has a second width W2 smaller than the width of the storage line of FIG. 1.

The second storage capacitor 162 compensates for the first storage capacitor 160 having a small capacitance value. The second storage capacitor 162 is provided such that the second storage line 158, adjacent to the previous stage gate line 102, overlaps a third active layer 156 connected to the first and second active layers 114 and 150 of the previous stage TFT 130, to act as a lower storage electrode with the gate insulating film 112 between the third active layer 156 and the second storage line 158.

The third storage capacitor 168 is provided such that a third storage line 164, adjacent to the current stage data line 104 and connected to the first and second storage lines 152 and 158, overlaps the fourth active layer 166, connected to the second and third active layers 150 and 156, to act as a lower storage electrode with the gate insulating film 112 between the third storage line 164 and the fourth active layer 166.

The fourth storage capacitor 170 is provided such that a fourth storage line 172, adjacent to the next stage data line 104 and connected to the first and second storage lines 152 and 158, overlaps a fifth active layer 174 extending from the second and third active layers 150 and 156, to act as a lower storage electrode having the gate insulating film 112 between the fourth storage line 172 and the fifth active layer 174.

As described above, the poly-silicon type thin film transistor substrate according to the third embodiment of the present invention is provided with the first through fourth storage capacitors 160, 162, 168 and 170 in such a manner to be adjacent to the gate lines 102 and the data lines 104, which overlap a black matrix. The first through fourth storage capacitors are adjacent to the gate lines and the data lines at areas contributing a small degree to the aperture ratio such that the poly-silicon type TFT substrate according to the third embodiment of the present invention can improve an aperture ratio and can further improve an aperture ratio in comparison with the poly-silicon type TFT substrate according to the first embodiment of the present invention. Further, the first through fourth storage lines serving as electrodes of the first to fourth storage capacitors are connected to each other, and the second and third active layers also are connected via the fourth and fifth active layers.

Figure 8A:
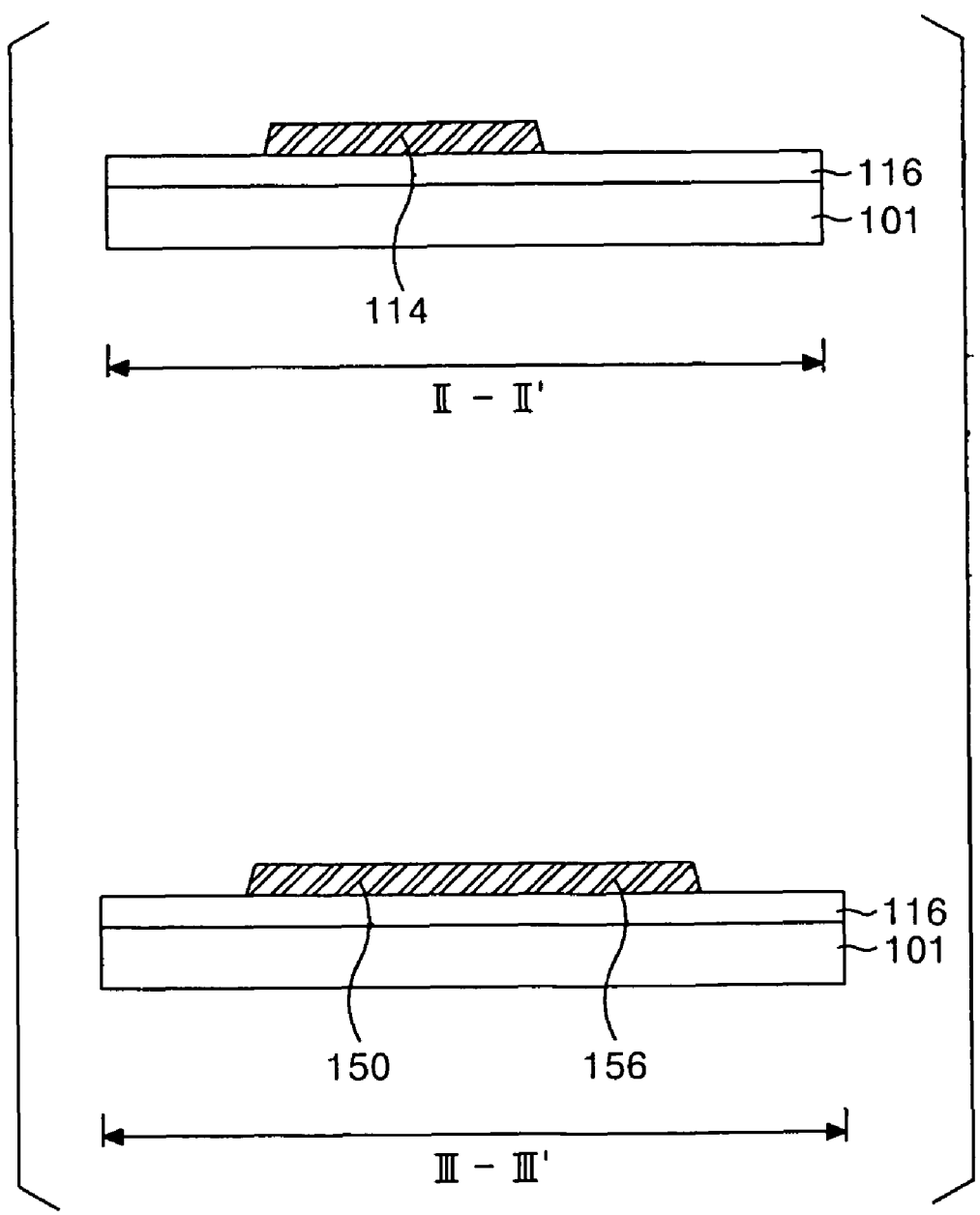
FIG. 8A to FIG. 8H are cross-sectional views illustrating a method of fabricating a thin film transistor substrate according to embodiments of the present invention along line II-II' and line III-III' in FIG. 7. are cross-sectional views.

A poly-silicon type TFT substrate can be formed by a fabrication process shown in FIG. 8A to FIG. 8H. Herein, the poly-silicon type TFT substrate shown in FIG. 4 will be described as an example. Referring to FIG. 8A, the buffer film 116 is formed on the lower substrate 101, and the first through third active layers 114, 150 and 156 are formed thereon. The buffer film 116 is formed by depositing an inorganic insulating material, such as $SiO_2$, onto the lower substrate 101. The first through third active layers 114, 150 and 156 are formed by depositing an amorphous silicon onto the buffer film 116 and then crystallizing it into a poly-silicon by a laser; and thereafter patterning the poly-silicon with a photolithography and the etching process.

Figure 8B:
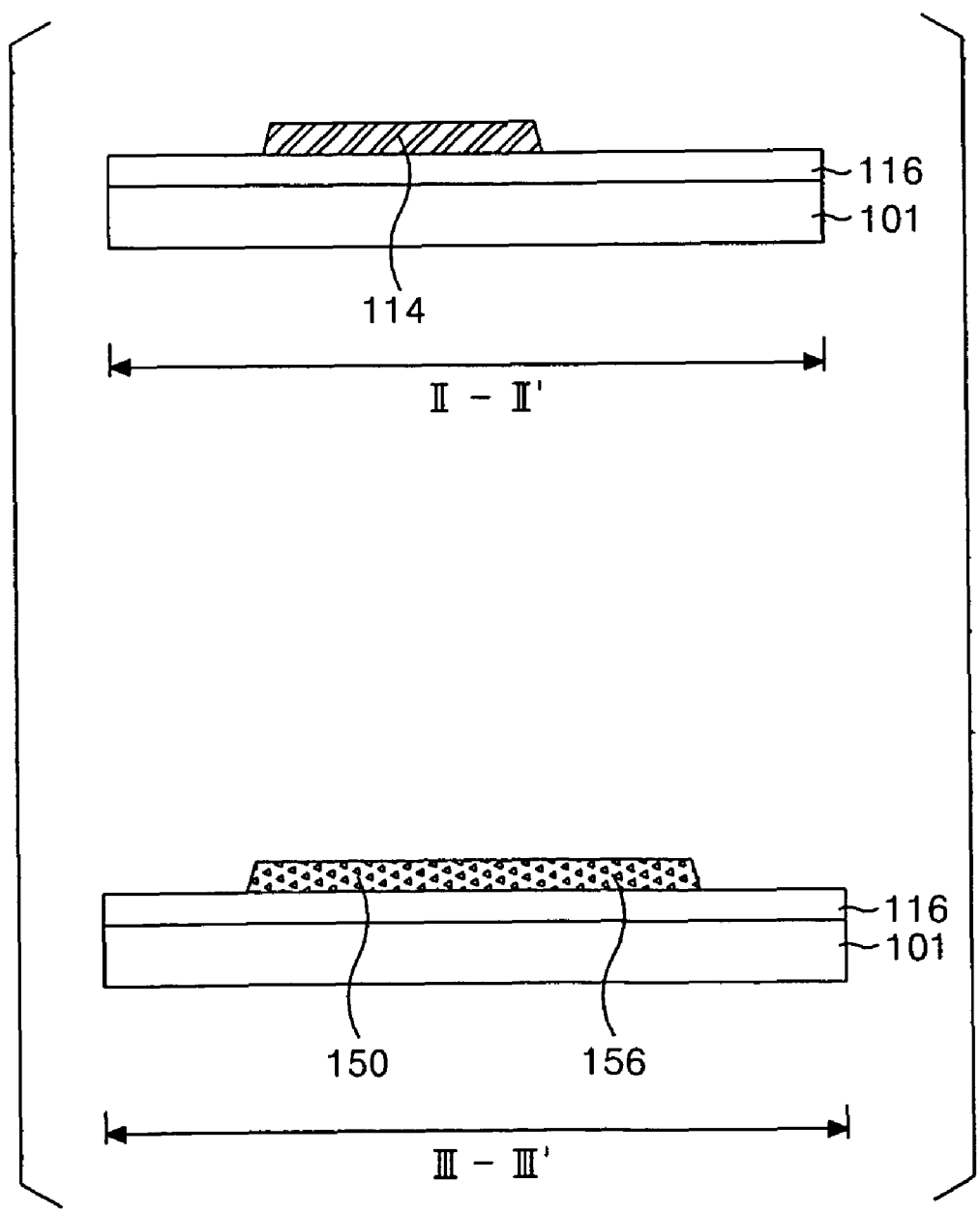

Referring to FIG. 8B, n-type impurities are injected into the second and third active layers 150 and 156 such that they serve as lower storage electrodes. More specifically, a photoresist pattern exposing the second and third active layers 150 and 156 is formed by the photolithography and then n-type impurities, such as $PH_3$, are doped into the exposed second and third active layers 150 and 156. Thereafter, the photoresist pattern is removed.

Figure 8C:
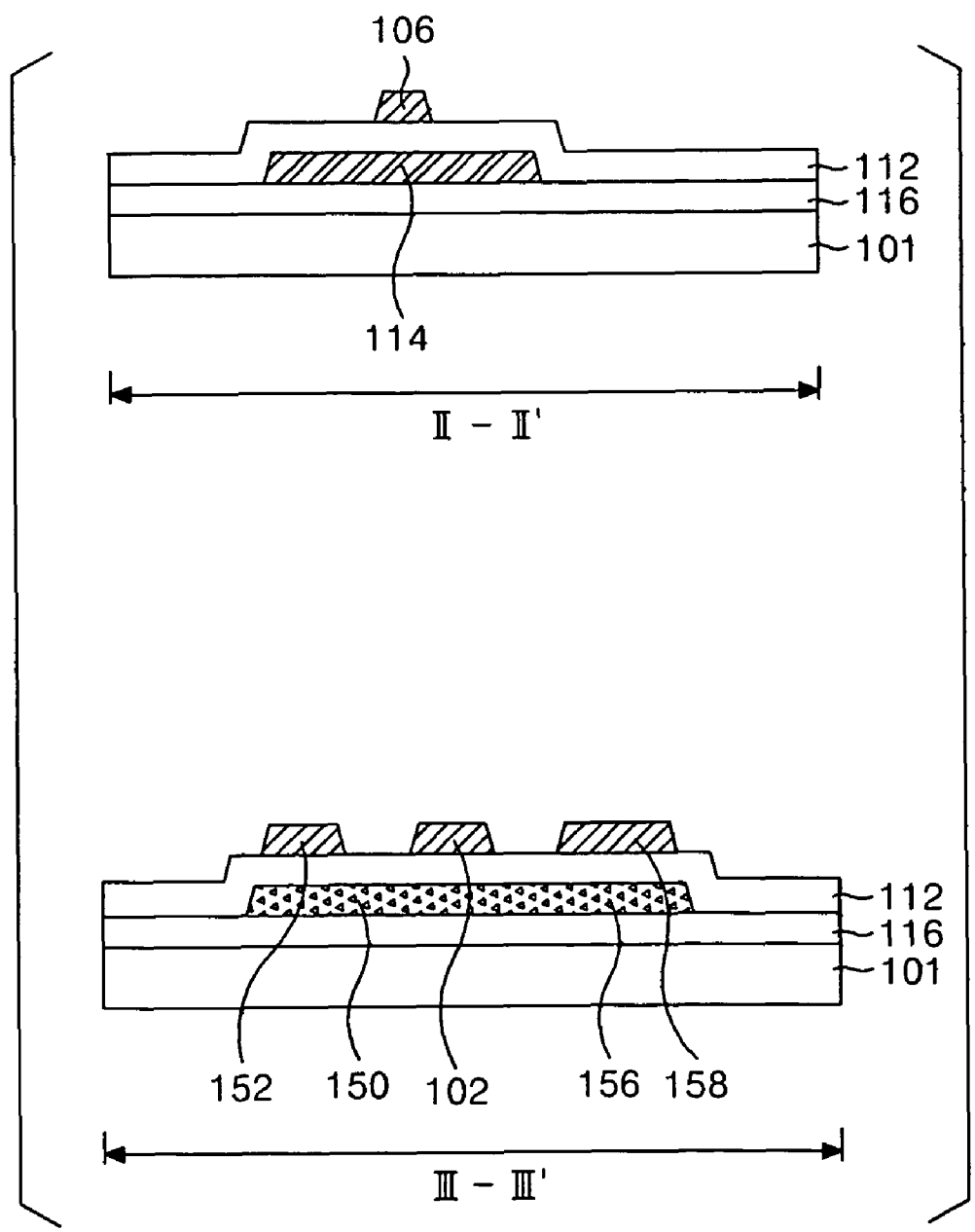

Referring to FIG. 8C, the gate insulating film 112 is formed on the buffer film 116 provided on the first to third active layers 114, 150 and 156. Then, the gate electrode 106, the gate line 102 and the first and second storage lines 152 and 158 are formed thereon. The gate insulating film 112 is formed by depositing an inorganic insulating material, such as $SiO_2$, onto the buffer film 116 along with the active layers 114, 150 and 156. The gate electrode 106, the gate line 102 and the first and second storage lines 152 and 158 are provided by forming a gate metal layer on the gate insulating film 112 and thereafter patterning the gate metal layer by a photolithography and an etching process. Further, n⁻ type impurities are doped into the first active layer 114 by utilizing the gate electrode 106 as a mask, to thereby provide LDD areas that are not overlapped by the gate electrode 106.

Figure 8D:
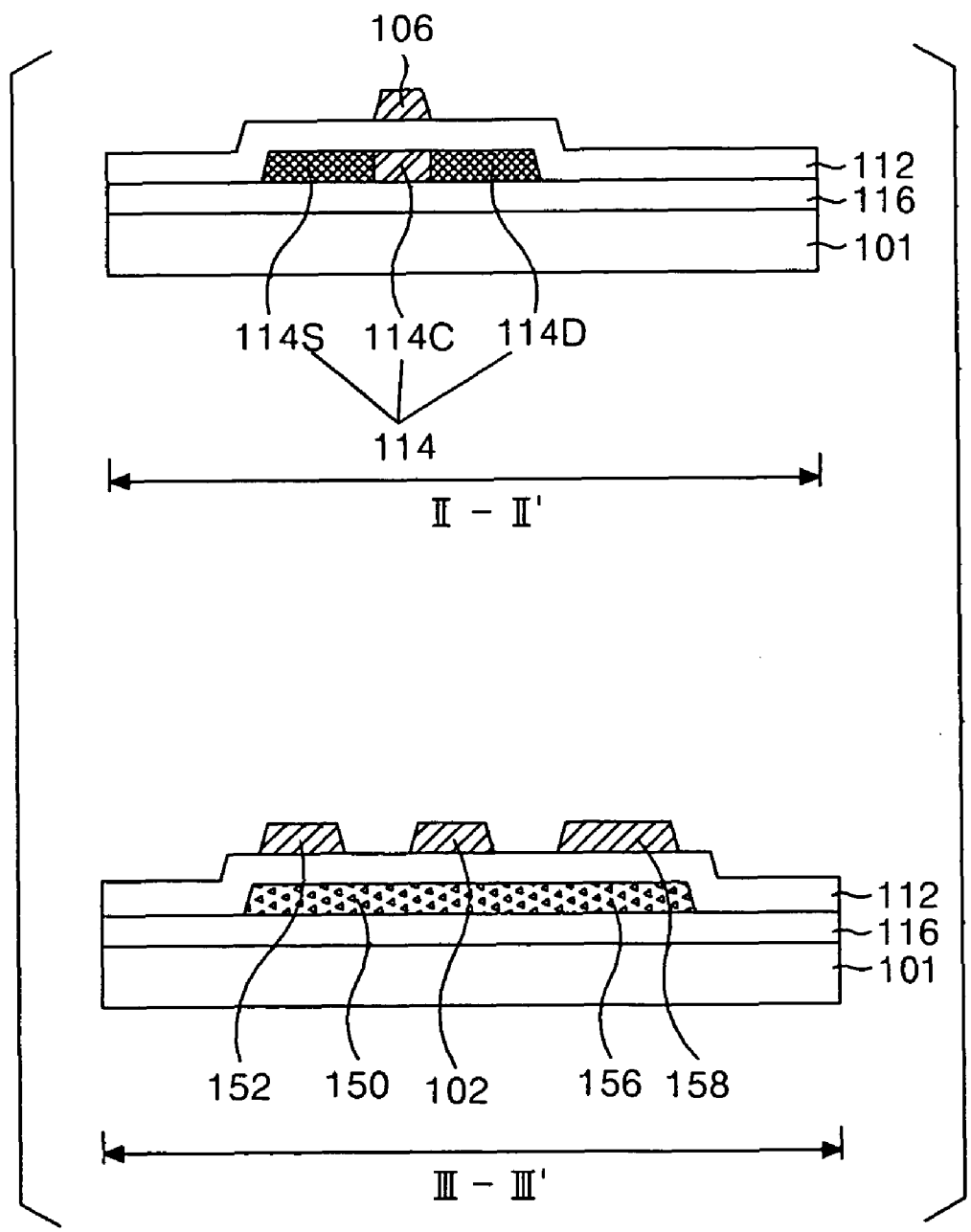

Referring to FIG. 8D, n⁺ type impurities are doped into the first active layer 114 to provide the source area 114S and the drain area 114D of the first active layer 114. More specifically, a photo-resist pattern exposing only the source area 114S and the drain area 114D of the first active layer 114 is formed by photolithography. Further, n⁺ type impurities are doped into the exposed source and drain areas 114S and 114D of the first active layer 114 and thereafter the photo-resist pattern is removed. The source and drain areas 114S and 114D of the first active layer 114 are opposed to each other with the channel area 114C overlapping the gate electrode 106. Subsequently, p⁺ type impurities are doped into the active layer provided in the driving circuitry as mentioned above.

Figure 8E:
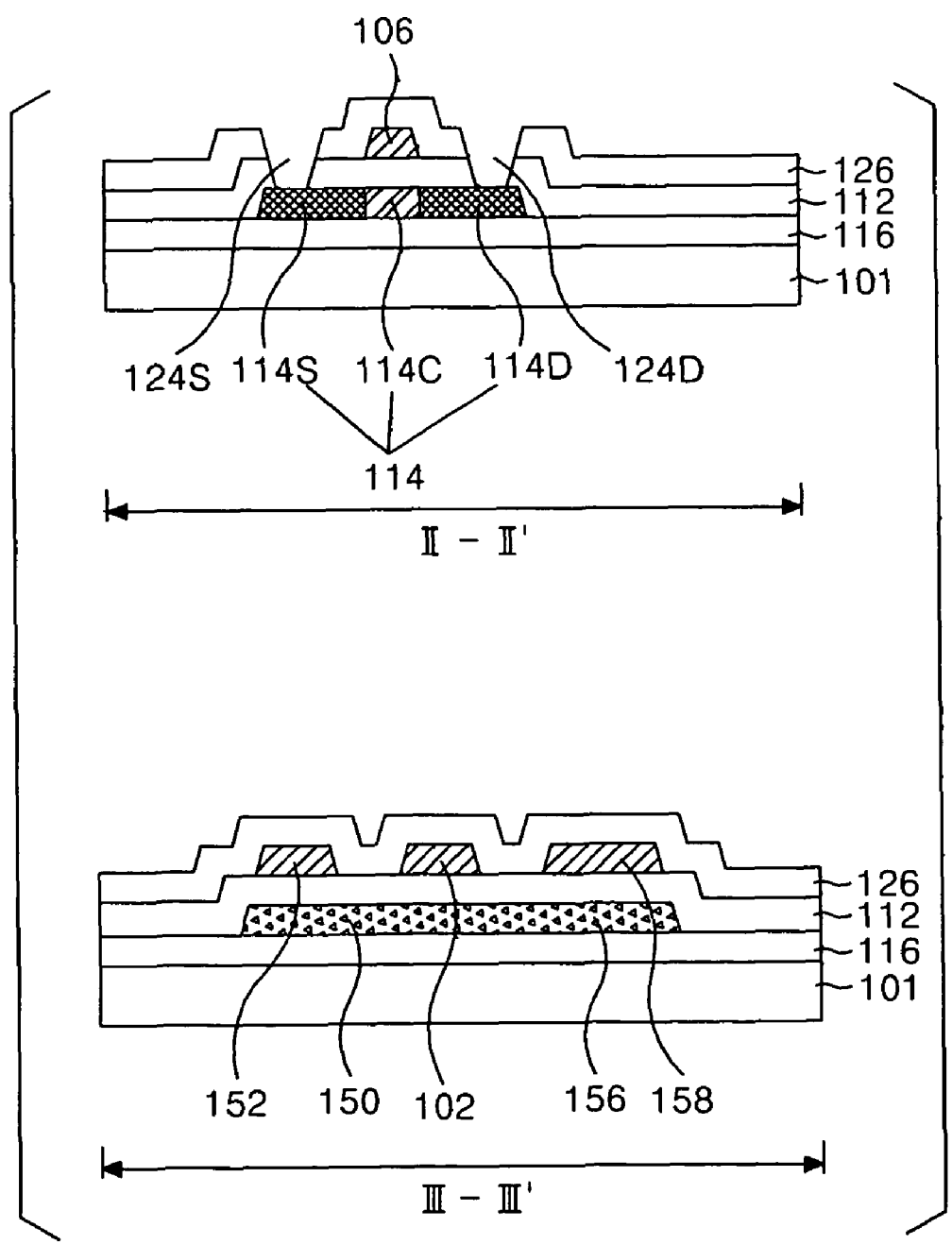

Referring to FIG. 8E, the interlayer insulating film 126 is formed over the gate insulating film 112, and the source and drain contact holes 124S and 124D are defined. The interlayer insulating film 126 is formed by depositing an inorganic insulating material, such as $SiO_2$, onto the gate insulating film 112. Subsequently, the interlayer insulating film 126 and the gate insulating film 112 are patterned by photolithography and an etching process to provide source and drain contact holes 124S and 124D for respectively exposing the source and drain areas 114S and 114D of the first active layer 114.

Figure 8F:
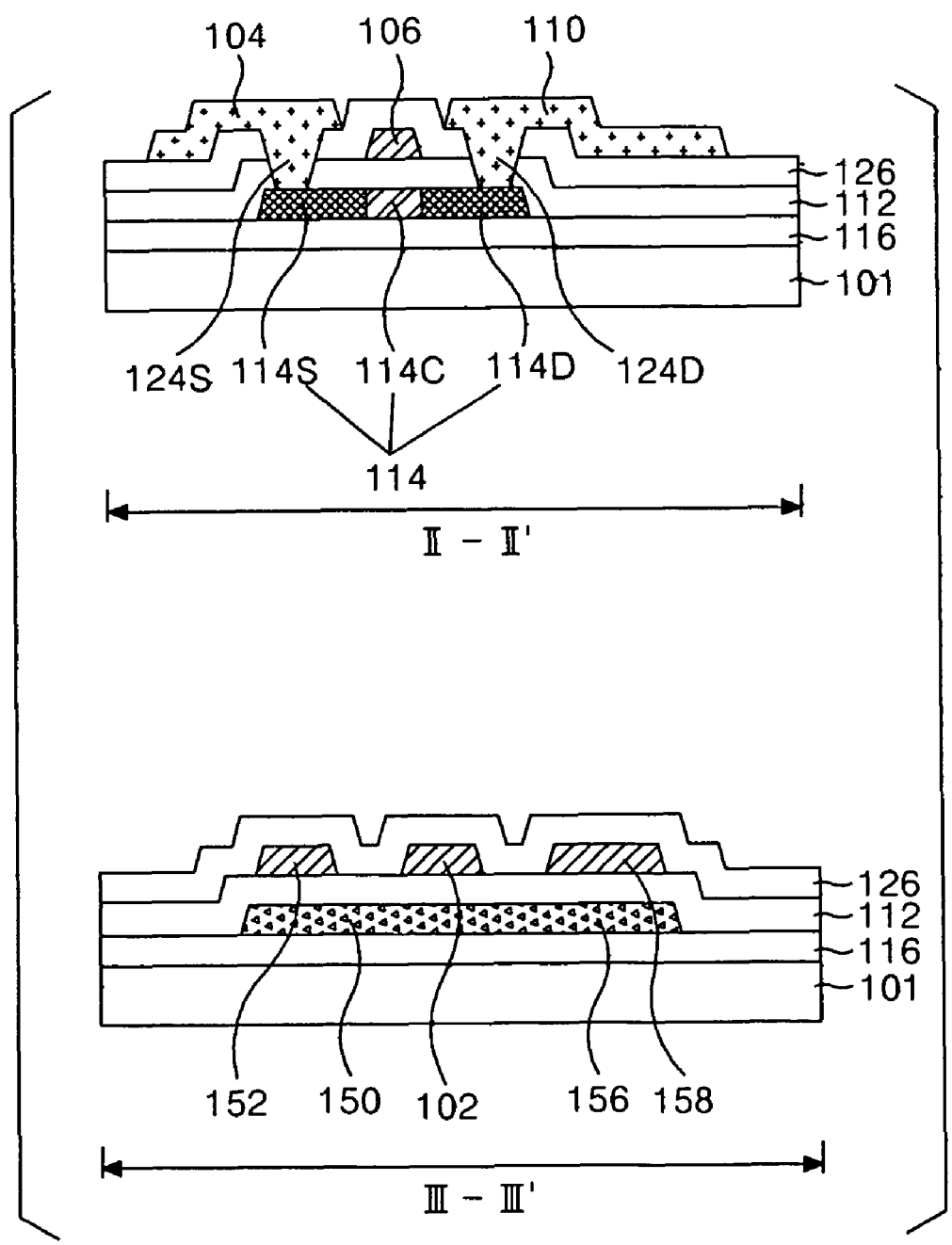

Referring to FIG. 8F, the data line 104, the source electrode 108 and the drain electrode 110 are provided on the interlayer insulating film 126. The data line 104, the source electrode 108 and the drain electrode 110 are provided by forming a source/drain metal layer on the interlayer insulating film 126 and then patterning the source/drain metal layer by photolithography and an etching process. The source electrode 108 and the drain electrode 110 are connected, via the source and drain contact holes 124S and 124D, to the source and drain areas 114S and 114D of the first active layer 114.

Figure 8G:
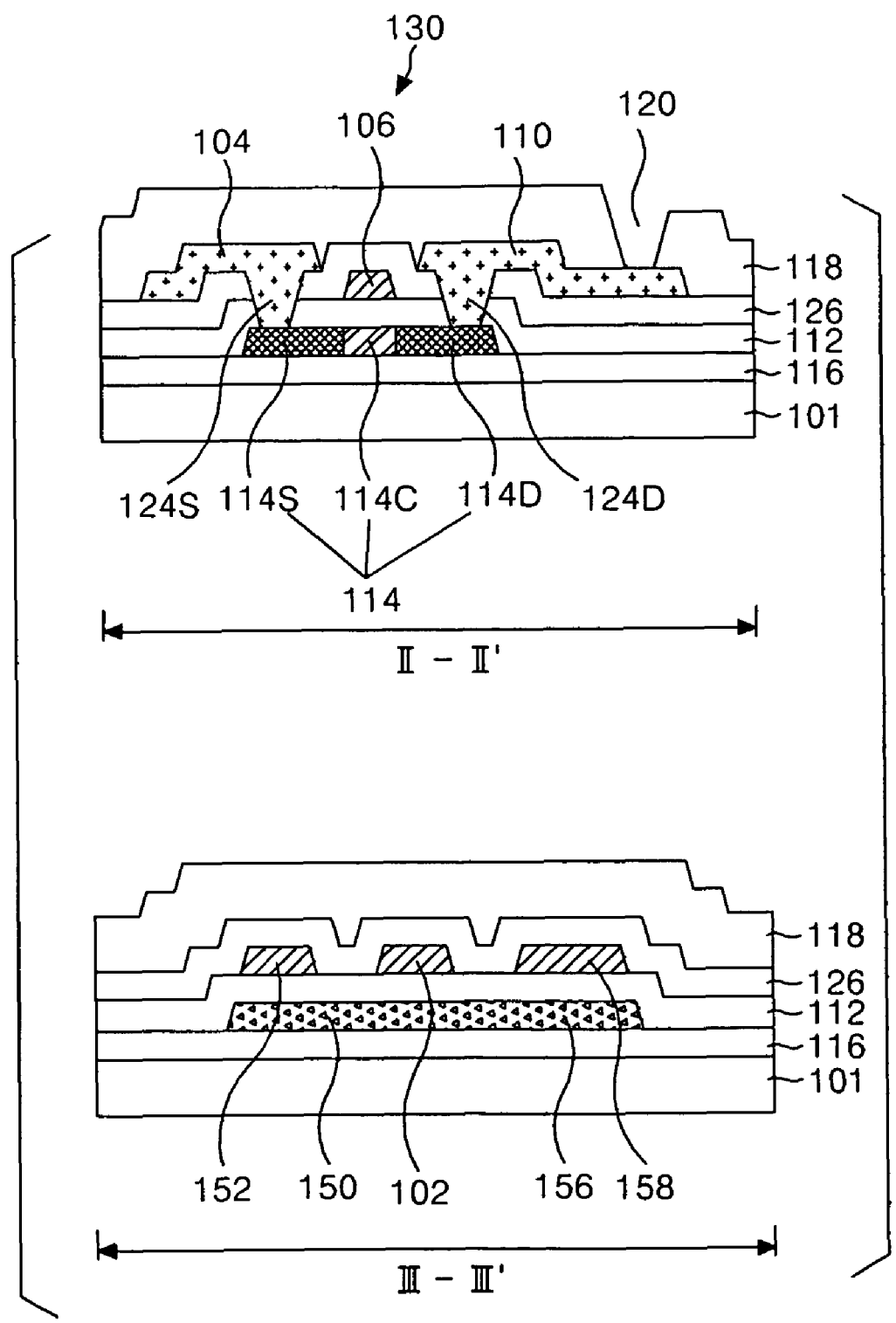

Referring to FIG. 8G, the protective film 18 is formed over the interlayer insulating film 126, the data line 104, the source electrode 108 and the drain electrode 110. A pixel contact hole 120 passing through the protective film 118. The protective film 118 is formed by depositing an inorganic insulating material or an organic insulating material over the interlayer insulating film 126, the data line 104 and the drain electrode 110. Subsequently, the protective film 118 is patterned by photolithography and an etching process, to thereby define the pixel contact hole 120 exposing the drain electrode 110 of the TFT 130 through the protective film 118.

Figure 8H:
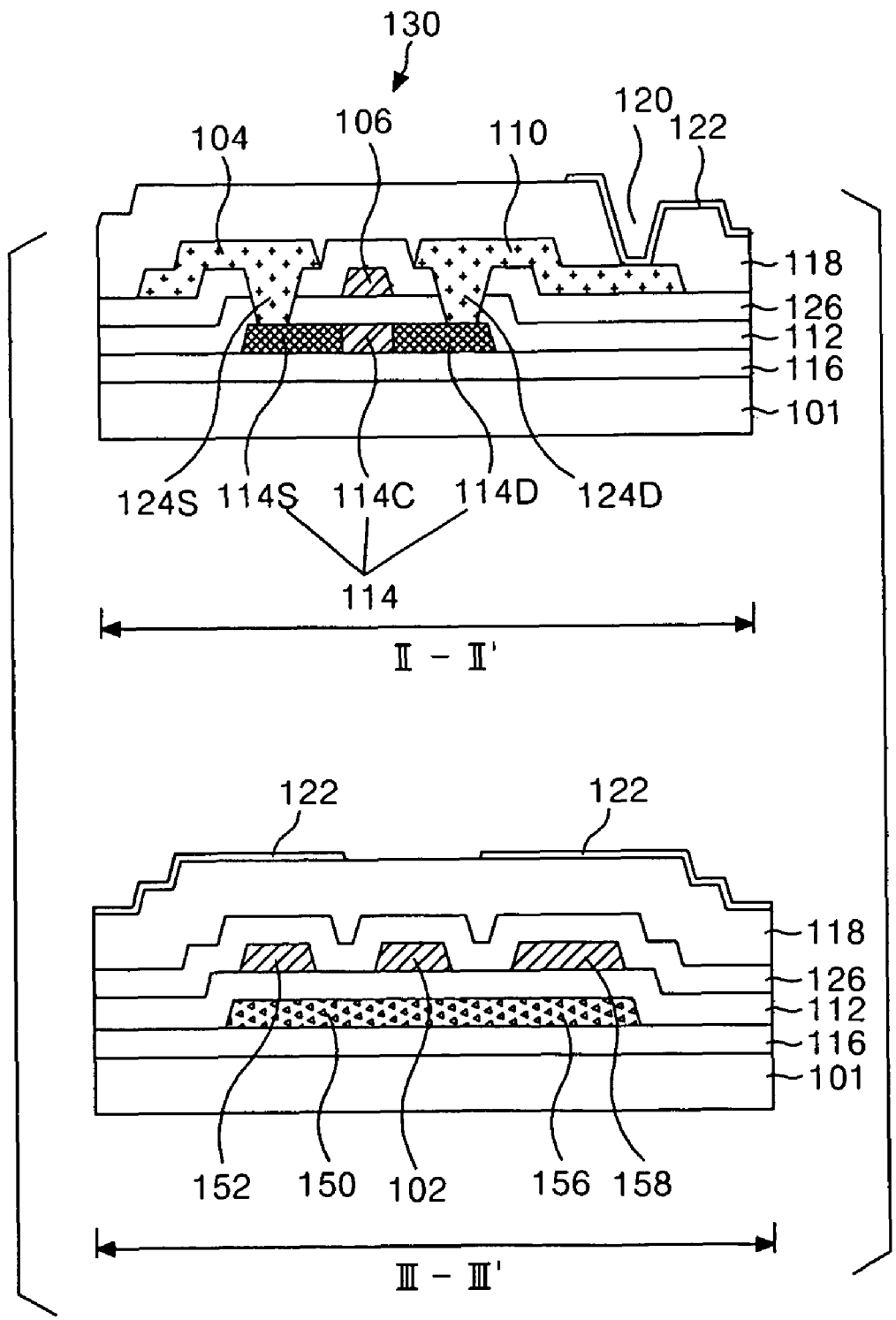

Referring to FIG. 8H, the pixel electrode 122 is formed on the protective film 118. More particularly, the pixel electrode 122 is provided by depositing a transparent conductive material on the protective film 118 and then patterning the transparent conductive material by photolithography and an etching process. The pixel electrode 122 is connected, via the pixel contact hole 120, to the drain electrode 110 of the TFT 130.

Figure 9:
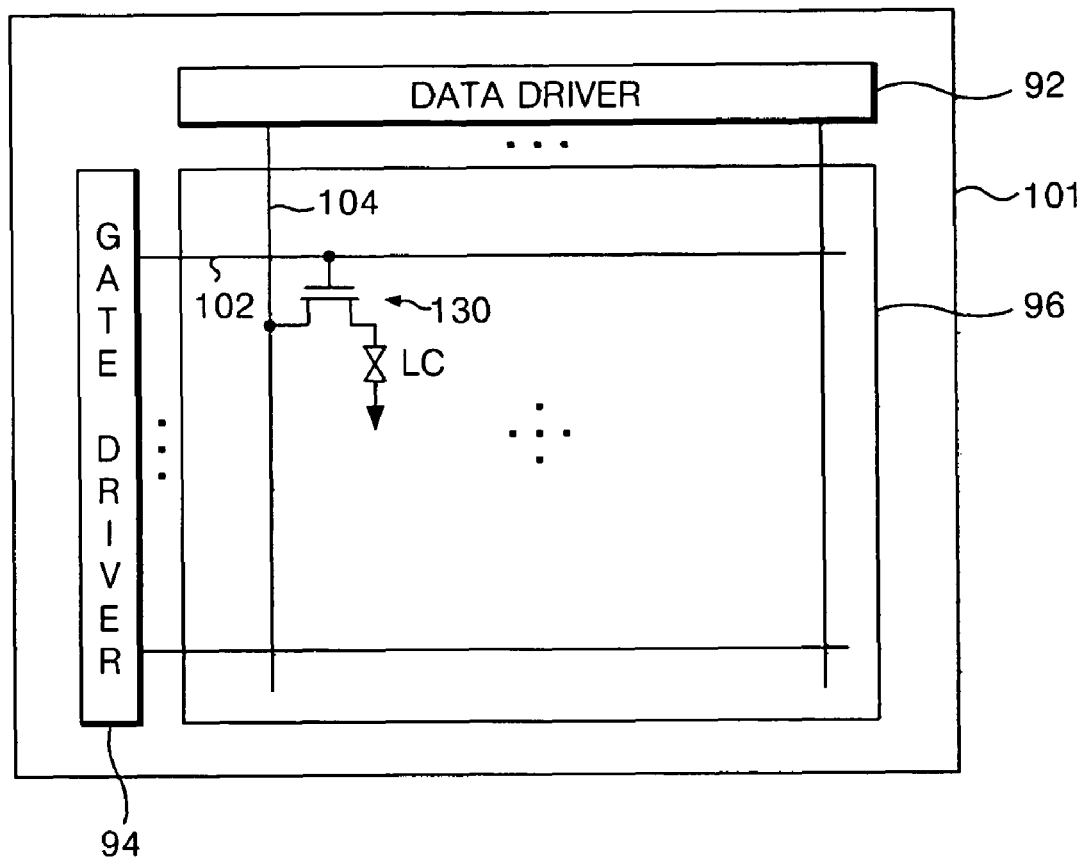
FIG. 9 is a schematic view showing a structure of a liquid crystal display panel including the thin film transistor substrate employing the poly-silicon according to the first through third embodiments of the present invention.

FIG. 9 is a schematic view showing a structure of a liquid crystal display panel including the thin film transistor substrate employing the poly-silicon according to the first through third embodiments of the present invention. Referring to FIG. 9, the liquid crystal display panel includes a picture display part 96 having a liquid crystal cell matrix, a data driver 92 for driving the data line 104 of the picture display part 96, and a gate driver 94 for driving the gate line 102 of the picture display part 96. The picture display part 96 has liquid crystal cells LC arranged in a matrix to display a picture. Each of the liquid crystal cells LC has the TFT 130 connected to the gate line 102 and the data line 104.

The gate driver 94 sequentially drives the gate line 102. The data driver 92 applies a video signal to the data line 104 whenever the gate line 102 is driven. The TFT 130 switches a video signal from the data line 104 onto the liquid crystal cell LC in response to a scanning signal from the gate line 102. The liquid crystal cell LC having a dielectric anisotropy reacts to the charged video signal to control light transmittance, thereby implementing a gray level.

In completing a liquid crystal display panel, a TFT substrate, provided with the data driver 92, the gate driver 94 and liquid crystal cells LC each having the TFT 130, to a color filter substrate provided with a common electrode and a color filter are attached with each other. Thereafter, the liquid crystal is provided between the TFT substrate and the color filter substrate. The poly-silicon type TFT substrate according to any one of the first to third embodiments of the present invention employs a poly-silicon having approximately hundred times faster than amorphous silicon in electric charge mobility. Accordingly, the liquid crystal display panel including the poly-silicon type TFT substrate according to any one of the first to third embodiments of the present invention can have a driving circuit on the substrate 101 with a high response speed.

As described above, according to embodiments of the present invention, a storage capacitor is provided in such a manner as to be adjacent to a signal line that is an area having a low contribution to the aperture ratio. Accordingly, it becomes possible to prevent a deterioration of aperture ratio caused by the storage capacitor, thereby improving aperture ratio. Further, according to exemplary embodiments of the present invention, the active layer of the TFT employs a poly-silicon having a fast electric charge mobility, so that driving circuits having a high response speed can be obtained.

It will be apparent to those skilled in the art that various modifications and variations can be made in the to a thin film transistor substrate of polycrystalline silicon type and a fabricating method the same of the present invention without departing from the spirit or scope of the invention. Thus, it is intended that the present invention cover the modifications and variations of this invention provided they come within the scope of the appended claims and their equivalents.

What is claimed is:

1. A thin film transistor substrate, comprising:
   a plurality of gate lines and a plurality of data lines defining a plurality of adjacent pixels;
   a pixel electrode in a first pixel of the plurality of adjacent pixels;
   a thin film transistor in the first pixel, having a gate electrode connected to one of the plurality of gate lines, a source electrode connected to one of the plurality of data lines, a drain electrode connected to the pixel electrode, and a first active layer of polysilicon formed parallel to the plurality of gate lines and defining a channel between the source electrode and the drain electrode, wherein the source electrode is connected to the first active layer through a source contact hole, wherein the drain electrode is connected to the first active layer through a drain contact hole, wherein the drain electrode is connect to the pixel electrode through a pixel contact hole, wherein the source contact hole, the drain contact hole and the pixel electrode are disposed in a row with each other, wherein the row is parallel with the plurality of gate lines;

a first storage line parallel to the plurality of gate lines and positioned on the pixel electrode;

a second storage line parallel to the plurality of gate lines, electrically connected to the first storage line, and positioned on the pixel electrode;

a second active layer parallel to the gate line and extending over the first storage line with a gate insulating film between the second active layer and the first storage line for providing a first storage capacitor; and a third active layer parallel to the gate line and extending over the second storage line with the gate insulating film between the second storage line and the third active layer for providing a second storage capacitor, wherein the first active layer, the second active layer and the third active layer are integrally formed and not connected to the active layers of the plurality of adjacent pixels formed in the extending direction of the gate line, and wherein the first storage line is spaced apart from the second storage line.

2. The thin film transistor substrate according to claim 1, further comprising:

a third storage line parallel to the plurality of data lines and positioned on the pixel electrode; and a fourth storage line parallel to the plurality of date lines and positioned on the pixel electrode.

3. The thin film transistor substrate according to claim 2, further comprising:

a fourth active layer extending from the second active layer and overlapping the third storage line with the gate insulating film between the fourth active layer and the third storage line for forming a third storage capacitor; and a fifth active layer extending from the second active layer and overlapping the fourth storage line with the gate insulating film between the fifth active layer and the fourth storage line for forming a fourth storage capacitor.

4. The thin film transistor substrate according to claim 2, wherein the first storage line is connected to the third and the fourth storage lines.

5. The thin film transistor substrate according to claim 3, wherein the second, third, fourth and fifth active layers are formed of poly-silicon.

6. A poly-silicon type thin film transistor substrate, comprising:

a plurality of gate lines and a plurality of data lines defining a first pixel and a second pixel;

a first pixel electrode in the first pixel and a second pixel electrode in the second pixel;

a first and a second thin film transistor, each having a gate electrode connected to one of the gate lines, a source electrode connected to one of the data lines, a drain electrode connected to one of the pixel electrodes, and a poly-silicon type first active layer parallel to the gate line and defining a channel between the source electrode and the drain electrode, wherein the source electrode is connected to the first active layer through a source contact hole, wherein the drain electrode is connected to the first active layer through a drain contact hole, wherein the drain electrode is connect to the pixel electrode through a pixel contact hole, wherein the source contact hole, the drain contact hole and the pixel electrode are disposed in a row with each other, wherein the row is parallel with the gate line;

a first storage line parallel to the plurality of gate lines and positioned in the first pixel;

a second storage line parallel to the plurality of gate lines, electrically connected to the first storage line, and positioned in the first pixel;

a second active layer parallel to the plurality of gate lines and extending over the first storage line with a gate insulating film between the second active layer and the first storage line for providing a first storage capacitor to the first pixel; and a third active layer parallel to the plurality of gate lines and extending over the second storage line with the gate insulating film between the second storage line and the third active layer for providing a second storage capacitor to the first pixel, wherein the first active layer, the second active layer, and the third active layer are integrally formed and not connected to the active layers of the second pixel, wherein the first storage line is spaced apart from the second storage line, and wherein the first storage capacitor and the second storage capacitor are positioned at an area adjacent to the gate lines that is overlapped with a black matrix.

7. The poly-silicon type thin film transistor substrate as claimed in claim 6, further comprising:

a third storage line parallel to the plurality of data lines and positioned on the pixel electrode; and a fourth storage line parallel to the plurality of date lines and positioned on the pixel electrode.

8. The poly-silicon type thin film transistor substrate as claimed in claim 7, further comprising:

a fourth active layer extending from the second active layer and overlapping the third storage line with the gate insulating film between the fourth active layer and the third storage line for forming a third storage capacitor; and a fifth active layer overlapping the fourth storage line with the gate insulating film between the fifth active layer and the fourth storage line for forming a fourth storage capacitor.

9. The poly-silicon type thin film transistor substrate as claimed in claim 7, wherein the third storage line is connected to the first storage line.

* * * * *